(12) United States Patent
Lin et al.

(10) Patent No.: US 8,369,003 B2
(45) Date of Patent: Feb. 5, 2013

(54) WAVELENGTH TUNABLE SINGLE-PASS OPTICAL PARAMETRIC AMPLIFIER

(75) Inventors: Yen-Yin Lin, Hsinchu (TW); Yan-Wei Tzeng, Taipei (TW); Chen-Han Huang, Tainan (TW); Jian-Ming Liu, Taipei (TW); Shi-Wei Chu, Taipei (TW)

(73) Assignee: National Taiwan University, Taipei (TW)

( * ) Notice: Subject to any disclaimer, the term of this patent is extended or adjusted under 35 U.S.C. 154(b) by 348 days.

(21) Appl. No.: 12/753,684

(22) Filed: Apr. 2, 2010

(65) Prior Publication Data
US 2011/0069375 A1   Mar. 24, 2011

(30) Foreign Application Priority Data

Sep. 23, 2009 (TW) ................................ 98132171 A

(51) Int. Cl.
*G02F 1/37* (2006.01)
*G02F 1/39* (2006.01)

(52) U.S. Cl. ............................ 359/330; 359/328; 372/22
(58) Field of Classification Search .......... 359/326–332; 372/21–22
See application file for complete search history.

(56) References Cited

U.S. PATENT DOCUMENTS

| 5,663,973 | A * | 9/1997 | Stamm et al. .................. 372/20 |
| 8,023,538 | B2 * | 9/2011 | Marcinkevicius et al. ..... 372/25 |
| 8,040,929 | B2 * | 10/2011 | Imeshev et al. ................ 372/21 |

\* cited by examiner

*Primary Examiner* — Daniel Petkovsek

(57) ABSTRACT

A single-pass optical parametric amplifier is provided. The single-pass optical parametric amplifier comprises a light source emitting a fundamental wave having a wavelength range; a nonlinear material, which the fundamental wave passes therethrough to form a second harmonic generation wave having a light path; a supercontinuum generator extending the wavelength range of the fundamental wave to form a supercontinuum generation seed; and an optical parametric wavelength transformer transforming the supercontinuum generation seed and the second harmonic generation wave into a signal wave and an idler wave.

11 Claims, 1 Drawing Sheet

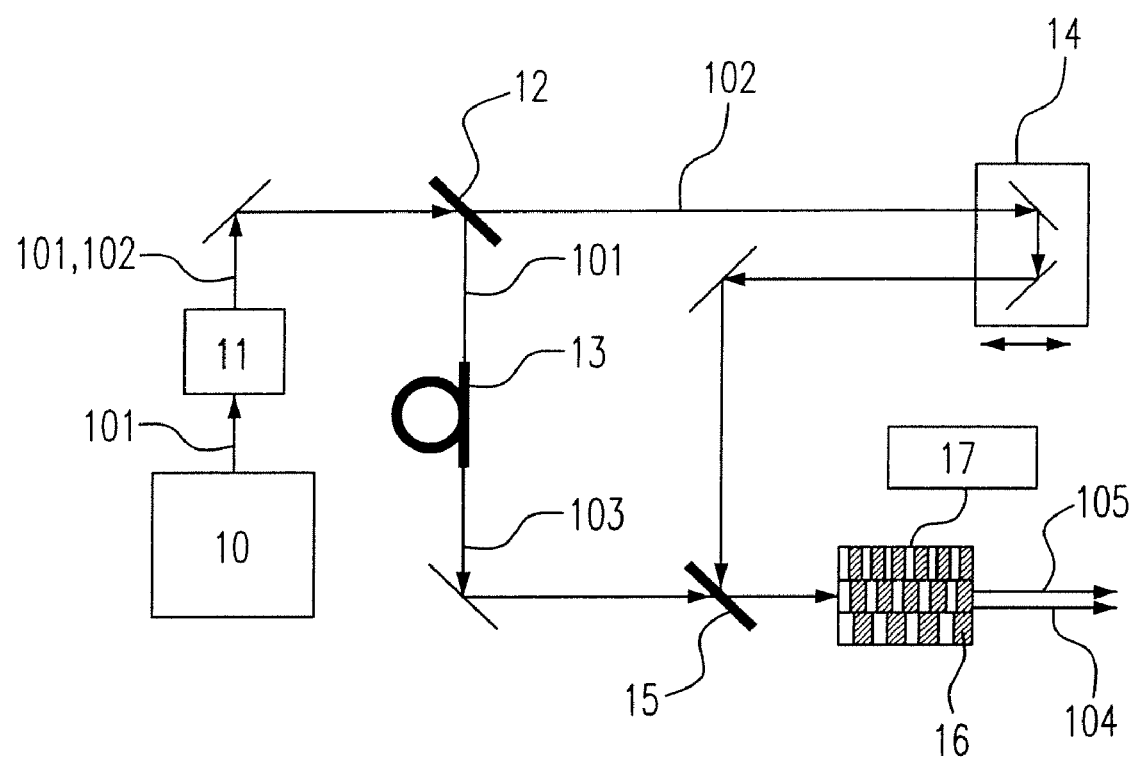

WAVELENGTH TUNABLE SINGLE-PASS OPTICAL PARAMETRIC AMPLIFIER

FIELD OF THE INVENTION

The present invention relates to a wavelength tunable single-pass optical parametric amplifier, and more particularly to a wavelength tunable single-pass optical parametric amplifier by using the single pulse laser providing the pump and seed, which are required in the optical parametric amplification at the same time.

BACKGROUND OF THE INVENTION

Tunable ultrafast light sources are important for various spectroscopic and microscopic applications, such as the pump-probe spectroscopy, fluorescence lifetime imaging microscopy (FLIM), and multiphoton microscopy/spectroscopy. Many previous applications were based on a Kerr-lens mode-locked Ti:sapphire laser. However, the tuning range of a Ti:sapphire laser is limited to around 700 nm-1000 nm because of the laser gain bandwidth of the Ti:sapphire crystal. To extend the wavelength range of an ultrafast laser, supercontinuum generation (SCG) or optical parametric amplification (OPA) has been adopted.

The so called supercontinuum is a light source with an extra-wide bandwidth, and SCG is capable of extending input laser wavelengths into both shorter and longer wavelength directions about hundreds of nm. Thus, the purpose of extending the wavelength range is realized. However, as a result of extending of the wavelength, the pulse energy spreading in each wavelength range will be reduced in a corresponding way. Nevertheless, inasmuch as SCG redistributes the pump power into a wide wavelength range, the power density of SCG is typically less than 1 mW/nm. In addition, the strong chromatic dispersion in the fibers significantly lengthens the pulses, and subsequently degrades the applicability of the SCG because of the reduced peak power and poor temporal characteristics.

Both energy conservation and phase-matching condition have to be fulfilled when a shorter-wavelength pump wave is down-converted into a signal and an idler wave simultaneously. If a seed having the same wavelength with the signal or the idler is provided, the probability of conversion would be raised higher due to being excited, and thus the density of the output signal and idler were amplified. Since the wavelengths of the output signal and idler are different from that of the pump, thus the wavelengths can be extended, and the wavelengths are adjusted by changing the conditions of phase-matching condition. Generally speaking, it is hard to find a seed which is continuously tunable from ultraviolet to near-infrared, so the systems designed by the principle of optical parametric amplification are most likely complex and huge. In the conventional implementation, the conversion efficiency of such system is still low, and thus a high-energy, low-repetition rate pump source or an oscillator cavity is required to improve the conversion efficiency, in which the signal and the idler vibrate back and forth due to resonance to accumulate profits and reduce the pump threshold in the optical parametric conversion process.

In the above-mentioned methods, regardless of raising laser energy, lowering the repetition rate or setting the oscillator cavity, not only the high cost and complex system are problems, but also for some industries, the low repetition rate is insufficient to handle the requirements in use. However if not so, the conversion efficiency can not be raised effectively. It is in a dilemma for a person ordinarily skilled in the art.

In order to overcome the drawbacks in the prior art, a wavelength tunable single-pass optical parametric amplifier is provided. The particular design in the present invention not only solves the problems described above, but also is easy to be implemented. Thus, the present invention has the utility for the industry.

SUMMARY OF THE INVENTION

In accordance with one aspect of the present invention, a wavelength tunable single-pass optical parametric amplifier is provided. The single-pass optical parametric amplifier comprises a light source emitting a fundamental wave having a wavelength range; a nonlinear material, which the fundamental wave passes therethrough to form a second harmonic generation wave having a light path; a supercontinuum generator extending the wavelength range of the fundamental wave to form a supercontinuum generation seed; and an optical parametric wavelength transformer transforming the supercontinuum generation seed and the second harmonic generation wave into a signal wave and an idler wave.

Preferably, the single-pass optical parametric amplifier further comprises a dichroic mirror separating the fundamental wave and the second harmonic generation wave; and a translational stage controlling the light path of the second harmonic generation wave.

Preferably, the single-pass optical parametric amplifier further comprises a cold mirror making the supercontinuum generation seed and the second harmonic generation wave proceed in an identical path to pass through the optical parametric wavelength transformer; and a temperature controller controlling a temperature of the optical parametric wavelength transformer.

Preferably, the supercontinuum generation seed and the second harmonic generation wave pass through the optical parametric wavelength transformer at the same time, and the signal wave and the idler wave are amplified.

Preferably, the supercontinuum generation seed has a wavelength range covering at least one of wavelengths of the signal wave and the idler wave.

Preferably, the light source is a single mode-locked Yb:fiber laser device having 50 MHz repetition rate, 5 W average power and 1 ps pulse width.

Preferably, the nonlinear material comprises $LiB_3O_5$ (LBO).

Preferably, the supercontinuum generator comprises a photonic crystal fiber.

Preferably, the optical parametric wavelength transformer comprises a nonlinear crystal which comprises magnesium oxide-doped periodically poled lithium niobate (MgO:PPLN) crystal.

Preferably, the supercontinuum generation seed has a wavelength range between 550 nm to 1900 nm.

In accordance with another aspect of the present invention, a method for transforming a laser wave is provided. The method comprises steps of providing the laser wave having a fundamental wave having a wavelength range; generating a second harmonic generation wave based on the fundamental wave; extending the wavelength range of the fundamental wave to form a supercontinuum generation seed; and transforming the second harmonic generation wave and the supercontinuum generation seed into a signal wave and an idler wave.

Preferably, the method further comprises a step after the step of generating a second harmonic generation wave: separating the fundamental wave and the second harmonic generation wave.

Preferably, the second harmonic generation wave and the supercontinuum generation seed are transformed into a signal wave and an idler wave via a way of quasi-phase-matching.

Preferably, the laser wave is a single mode-locked Yb:fiber laser having 50 MHz repetition rate, 5 W average power and 1 ps pulse width.

Preferably, generating the second harmonic generation wave is via frequency doubling the fundamental wave.

Preferably, the supercontinuum generation seed has a wavelength range covering at least one of wavelengths of the signal wave and the idler wave.

In accordance with a further aspect of the present invention, a single-pass optical parametric amplifier is provided. The single-pass optical parametric amplifier comprises a laser providing a fundamental wave having a wavelength range and a second harmonic generation wave; a supercontinuum generator extending the wavelength range of the fundamental wave to form a supercontinuum generation seed; and an optical parametric wavelength transformer transforming the supercontinuum generation seed and the harmonic generation wave.

Preferably, the single-pass optical parametric amplifier further comprises a dichroic mirror separating the fundamental wave and the second harmonic generation wave; and a cold mirror making the supercontinuum generation seed and the second harmonic generation wave proceed in an identical path to pass through the optical parametric wavelength transformer.

Preferably, the single-pass optical parametric amplifier further comprises a nonlinear material, which the fundamental wave passes therethrough to form a second harmonic generation wave due to frequency doubling and the nonlinear material comprises $LiB_3O_5$ (LBO).

Preferably, the supercontinuum generation seed and the second harmonic generation wave are transformed into a signal wave and an idler wave via the optical parametric wavelength transformer.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 1 shows the configuration of the single-pass optical parametric amplifier according to a preferred embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Please refer to FIG. 1, which shows the configuration of the single-pass optical parametric amplifier according to a preferred embodiment of the present invention. The laser 10 is a device of a single mode-locked ytterbium-doped fiber laser (mode-locked Yb:fiber laser), which can emit a laser light with 1 ps pulse width, 1040 nm central wavelength, 5 W average energy, 50 MHz repetition rate and 100 nJ pulse energy. The laser light has a fundamental wave 101 which passes through a nonlinear material 11. Under type I noncritical phase-matching, a 520 nm second harmonic generation wave 102 is formed due to frequency doubling. The repetition rate of the second harmonic generation wave 102 is 50 MHz, the same as that of the fundamental wave 101. The pulse energy is 10 nJ. In this embodiment, the nonlinear material 11 uses a $LiB_3O_5$ (LBO) nonlinear optical crystal.

After the laser light passes through the nonlinear material 11, the second harmonic generation wave 102 is still mixed with the fundamental wave 101. When both of them pass through the dichroic mirror, the second harmonic generation wave 102 is separated from the fundamental wave 101. Next, the fundamental wave 101 passes through a supercontinuum generator 13, which is a photonic crystal fiber. After the fundamental wave 101 is coupled with the supercontinuum generator 13, the mechanism of the supercontinuum generation is formed, which substantially extends the wavelength range of the fundamental wave 101 to be a supercontinuum generation seed 103. The extended wavelength range of the fundamental wave 101 is between 550 nm to 1900 nm.

In another side, the optical path of the second harmonic generation wave 102 is adjusted via a translational stage 14. Since the wavelength of the fundamental wave 101 is different from that of the second harmonic generation wave 102, and mediums for them to pass through in paths are different too, the optical path difference between the fundamental wave 101 and the second harmonic generation wave 102 may be generated. In order that the pulses in two waves can enter an optical crystal at the same time, the optical path difference in the present system is adjusted via the translational stage 14.

Then, the supercontinuum generation seed 103 and the second harmonic generation wave 102 passing through the translational stage 14 flock together at a cold mirror 15 to make both of them back to an identical optical path to pass through a multi-channel magnesium oxide-doped periodically poled lithium niobate (MgO:PPLN) crystal, which can be viewed as an optical parametric wavelength transformer 16. After the second harmonic generation wave 102 serving as a pump enters the optical parametric wavelength transformer 16, it would be transformed into a signal 104 and an idler 105 whose wavelengths, 800 nm and 1600 nm respectively, are different from that of the harmonic generation wave 102. At this time, the supercontinuum generation seed 103 serves as a seed. As a result of the principle of optical parametric amplification, the intensity of the signal 104 and the idler 105 can be amplified. Besides, due to the characteristic of the periodically poled crystal, the supercontinuum generation seed 103 and the harmonic generation wave 102 pass through the optical parametric wavelength transformer 16 via a way of quasi-phase-matching. This raises the conversion efficiency significantly.

Additionally, being a seed in the present invention, the supercontinuum generation seed 103 is generated from the fundamental wave 101 after supercontinuum generation, and the wavelength range thereof is extended to 550 nm to 1900 nm, covering the wavelength ranges of the signal 104 and the idler 105. In other words, the supercontinuum generation seed 103 provides an effect of double seed for the signal 104 and the idler 105 respectively. Hence, the conversion efficiency of the optical parametric amplification can be greatly enhanced.

Since the purpose of the present invention is to provide a wavelength tunable single-pass optical parametric amplifier by using the single pulse laser to provide the pump and seed required in the optical parametric amplification, the output wavelength can be adjusted through changing the conditions of quasi-phase-matching of the pump, signal and idler. In other words, by choosing the channels of different grating periods in the periodically poled crystal to provide the pump input, the wavelengths of the transformed signal 104 and idler 105 can be adjusted accordingly. Besides, the crystal temperature of the wavelength transformer 16 itself can be controlled in a range of 30-200° C. via a temperature controller 17. Therefore, accurate and detailed adjustment of the wavelength can be achieved. In the wavelength tunable single-pass optical parametric amplifier of the present invention, the adjustable wavelength range covers 700 nm to 1900 nm.

Moreover, since the laser of the present invention comes from a single laser, thus after providing the pump and seed required in the optical parametric amplification respectively, the condition of timing jitter between the pump and seed can be avoided. This can improve the stability of the system effectively. Basically, according to the system design of the present invention, under the conditions of not requiring the optical oscillator, the pulse repetition rate of up to 50 MHz, and only 10 nJ of the pulse energy of the second harmonic generation wave 102 serving as the pump, the conversion efficiency can reach 50%. Accordingly, the present invention is advanced and outstanding.

The optical materials used in the present invention basically are not limited to the crystal, laser or optical device mentioned in this embodiment. This embodiment is only an example of implementation; other materials having the same effect could also be substituted for the above-mentioned materials.

Based on the above, the present invention not only provides a wavelength tunable laser device having a large wavelength range, but under the conditions of not requiring the optical oscillator and saving the cost, the problem of low conversion efficiency resulting from the low pulse energy in the prior art can be effectively solved. Besides, the conditions of the time difference and instability conventionally generated from optical parametric amplification can also be avoided. Therefore, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A single-pass optical parametric amplifier, comprising:
   a laser source emitting a fundamental wave having a wavelength range;
   a nonlinear material, which the fundamental wave passes therethrough to form a second harmonic generation wave having a light path;
   a dichroic mirror separating the fundamental wave and the second harmonic generation wave;
   a supercontinuum generator extending the wavelength range of the fundamental wave to form a supercontinuum generation seed;
   a translational stage controlling the light path of the second harmonic generation wave;
   an optical parametric wavelength transformer transforming the supercontinuum generation seed and the harmonic generation wave into a signal wave and an idler wave;
   a cold mirror making the supercontinuum generation seed and the second harmonic generation wave proceed in an identical path to pass through the optical parametric wavelength transformer; and
   a temperature controller controlling a temperature of the optical parametric wavelength transformer.

2. A single-pass optical parametric amplifier as claimed in claim 1, wherein the supercontinuum generation seed and the second harmonic generation wave pass through the optical parametric wavelength transformer at the same time, and the signal wave and the idler wave are amplified.

3. A single-pass optical parametric amplifier as claimed in claim 2, wherein the supercontinuum generation seed has a wavelength range covering at least one of wavelengths of the signal wave and the idler wave.

4. A single-pass optical parametric amplifier as claimed in claim 1, wherein the laser source is a single mode-locked Yb:fiber laser device having 50 MHz repetition rate, 5 W average power and 1 ps pulse width.

5. A single-pass optical parametric amplifier as claimed in claim 1, wherein the nonlinear material comprises $LiB_3O_5$ (LBO).

6. A single-pass optical parametric amplifier as claimed in claim 1, wherein the supercontinuum generator comprises a photonic crystal fiber.

7. A single-pass optical parametric amplifier as claimed in claim 1, wherein the optical parametric wavelength transformer comprises a nonlinear crystal which comprises magnesium oxide-doped periodically poled lithium niobate (MgO:PPLN) crystal.

8. A single-pass optical parametric amplifier as claimed in claim 1, wherein the supercontinuum generation seed has a wavelength range between 550 nm to 1900 nm.

9. A single-pass optical parametric amplifier, comprising:
   a laser providing a fundamental wave having a wavelength range and a second harmonic generation wave;
   a nonlinear material, through which the fundamental wave passes to form a second harmonic generation wave due to frequency doubling;
   a dichroic mirror separating the fundamental wave and the second harmonic generation wave;
   a supercontinuum generator extending the wavelength range of the fundamental wave to form a supercontinuum generation seed;
   a translational stage controlling the light path of the second harmonic generation wave;
   an optical parametric wavelength transformer transforming the supercontinuum generation seed and the second harmonic generation wave;
   a cold mirror making the supercontinuum generation seed and the second harmonic generation wave proceed in an identical path to pass through the optical parametric wavelength transformer; and
   a temperature controller controlling a temperature of the optical parametric wavelength transformer.

10. A single-pass optical parametric amplifier as claimed in claim 9, wherein the nonlinear material comprises $LiB_3O_5$ (LBO).

11. A single-pass optical parametric amplifier as claimed in claim 9, wherein the supercontinuum generation seed and the second harmonic generation wave are transformed into a signal wave and an idler wave via the optical parametric wavelength transformer.

* * * * *